United States Patent
Zheng et al.

(10) Patent No.: US 10,432,626 B2
(45) Date of Patent: Oct. 1, 2019

(54) OPTICAL NETWORK UNIT ONU REGISTRATION METHOD, APPARATUS, AND SYSTEM

(71) Applicant: Huawei Technologies Co., Ltd., Shenzhen (CN)

(72) Inventors: Gang Zheng, Shenzhen (CN); Sanzhong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 15/346,579

(22) Filed: Nov. 8, 2016

(65) Prior Publication Data
US 2017/0054719 A1 Feb. 23, 2017

Related U.S. Application Data

(63) Continuation of application No. PCT/CN2014/077281, filed on May 12, 2014.

(51) Int. Cl.
*H04L 29/06* (2006.01)
*H04B 10/25* (2013.01)
(Continued)

(52) U.S. Cl.
CPC ......... *H04L 63/0876* (2013.01); *H04B 10/25* (2013.01); *H04B 10/27* (2013.01);
(Continued)

(58) Field of Classification Search
None
See application file for complete search history.

(56) References Cited

U.S. PATENT DOCUMENTS 7,602,800 B2 * 10/2009 Endo ..................... H04L 47/115
370/395.41
8,098,678 B2 * 1/2012 Endo ..................... H04L 47/115
370/395.41
(Continued)

FOREIGN PATENT DOCUMENTS

CN 1968089 A 5/2007
CN 101141410 A 3/2008
(Continued)

OTHER PUBLICATIONS

"Gigabit-capable passive optical networks (GPON): General characteristics," ITU-T Series G: Transmission Systems and Media, Digital Systems and Networks, Recommendation ITU-T G.984.1, International Telecommunication Union, Geneva, Switzerland (Mar. 2008).
(Continued)

*Primary Examiner* — Christopher A Revak
(74) *Attorney, Agent, or Firm* — Leydig, Voit & Mayer, Ltd.

(57) ABSTRACT

Embodiments of the present invention provide an optical network unit ONU registration method, apparatus, and system, to resolve a problem in the prior art that a registration process is cumbersome. The method includes: receiving an uplink optical signal, where the uplink optical signal carries ONU authentication information; sending the optical signal to a corresponding MAC module separately according to a wavelength of uplink light; extracting, by the MAC module, the ONU authentication information, and sending the extracted ONU authentication information to a processor; and receiving, by the processor, the ONU authentication information, and determining whether the ONU authentication information is consistent with ONU authentication information configured by an OLT, where if the ONU authentication information is consistent with the ONU authentication information configured by the OLT, an ONU is registered successfully.

6 Claims, 11 Drawing Sheets

(51) Int. Cl.
*H04J 14/02* (2006.01)
*H04B 10/27* (2013.01)
(52) U.S. Cl.
CPC ........ *H04J 14/026* (2013.01); *H04J 14/0235*
(2013.01); *H04J 14/0249* (2013.01); *H04J
14/0258* (2013.01); *H04L 63/083* (2013.01)

(56) References Cited

U.S. PATENT DOCUMENTS

| | | | | |
|---|---|---|---|---|
| 9,301,029 | B2* | 3/2016 | Hirth | H04Q 11/0062 |
| 10,069,731 | B2* | 9/2018 | Jain | H04M 11/062 |
| 2004/0085904 | A1 | 5/2004 | Bordogna et al. | |
| 2009/0049532 | A1 | 2/2009 | Gao et al. | |
| 2010/0098414 | A1 | 4/2010 | Kramer et al. | |
| 2010/0239252 | A1 | 9/2010 | Davis et al. | |
| 2013/0039182 | A1* | 2/2013 | Das | H04L 41/0816 370/235 |
| 2013/0094862 | A1 | 4/2013 | Luo et al. | |
| 2013/0230324 | A1* | 9/2013 | Gupta | H04L 12/2885 398/66 |
| 2015/0311980 | A1* | 10/2015 | Kuwano | H04L 12/2861 398/58 |
| 2016/0028638 | A1* | 1/2016 | Jin | H04L 12/6418 398/45 |
| 2017/0302379 | A1* | 10/2017 | Bernard | H04B 10/27 |

FOREIGN PATENT DOCUMENTS

| | | |
|---|---|---|
| CN | 101568046 A | 10/2009 |
| CN | 102104813 A | 6/2011 |
| CN | 102882801 A | 1/2013 |
| CN | 103379391 A | 10/2013 |

OTHER PUBLICATIONS

"Gigabit-capable passive optical networks (GPON): General characteristics," ITU-T Series G: Transmission Systems and Media, Digital Systems and Networks, Recommendation ITU-T G.984.1—Amendment 1, International Telecommunication Union, Geneva, Switzerland (Oct. 2009).

"Gigabit-capable passive optical networks (GPON): General characteristics," ITU-T Series G: Transmission Systems and Media, Digital Systems and Networks, Recommendation ITU-T G.984.1—Amendment 2, International Telecommunication Union, Geneva, Switzerland (Apr. 2012).

"Gigabit-capable passive optical networks (GPON): Transmission convergence layer specification," ITU-T Series G: Transmission Systems and Media, Digital Systems and Networks, Recommendation ITU-T G.984.3, International Telecommunication Union, Geneva, Switzerland (Jan. 2014).

"10-Gigabit-capable passive optical networks (XG-PON): General Requirements," ITU-T Series G: Transmission Systems and Media, Digital Systems and Networks, Recommendation ITU-T G.987.1, International Telecommunication Union, Geneva, Switzerland (Jan. 2010).

"10-Gigabit-capable passive optical networks (XG-PON): Transmission convergence (TC) layer specification," ITU-T Series G: Transmission Systems and Media, Digital Systems and Networks, Recommendation ITU-T G.987.3, International Telecommunication Union, Geneva, Switzerland (Jan. 2014).

Effenberger et al., Next-Generation PON—Part III: System Specifications for XG-PON, IEEE Communications Magazine, Topics in Optical Communications, XP11284155, pp. 58-65, Institute of Electrical and Electronics Engineers, New York, New York (Nov. 2009).

* cited by examiner

OPTICAL NETWORK UNIT ONU REGISTRATION METHOD, APPARATUS, AND SYSTEM

CROSS-REFERENCE

This application is a continuation of International Patent Application No. PCT/CN2014/077281, filed on May 12, 2014, which is hereby incorporated by reference in its entirety.

TECHNICAL FIELD

The present invention relates to the field of communications, and in particular, to an optical network unit ONU registration method, apparatus, and method.

BACKGROUND

A gigabit-capable passive optical network (GPON) technology is a point-to-multipoint fiber access technology, and a PON is formed by an optical line terminal (OLT) on a central office side, an optical network unit (ONU) on a user side, and an optical distribution network (ODN). Multiple terminal ONUs or ONU devices may be linked to a PON port of a same OLT by using an ODN network. In a PON system, downlink transmission is performed in a broadcasting manner, and uplink transmission is performed in a time division multiplexing manner.

ITU-T G984 series define a GPON system, and ITU-T G988 series define an XG-PON (10G-GPON) system. In a GPON system, a downlink rate is 2.5 Gbps, and an uplink rate is 1.25 Gbps or 2.5 Gbps; in an XG-PON system, a downlink rate is 10 Gbps, and an uplink rate is 2.5 Gbps. In a GPON system, a downlink wavelength is 1480 to 1500 nm, and an uplink wavelength is 1300 to 1320 nm; in an XG-PON system, a downlink wavelength is 1575 to 1580 nm, and an uplink wavelength is 1260 to 1280 nm.

Currently, the GPON system has been widely applied over the world; the XG-PON is a PON with a higher rate, and is a direction for future evolution of the GPON. The GPON system and the XG-PON system may coexist for quite a long period of time.

In an existing ONU registration method, a GPON ONU and an XG-PON ONU need to be registered separately, and a registration process is cumbersome.

SUMMARY

Embodiments of the present invention provide an optical network unit (ONU) registration method, apparatus, and system, to resolve a problem in the prior art that a registration process is cumbersome.

According to a first aspect, an optical line terminal (OLT) is provided, including: an optical module, configured to receive an uplink optical signal, where the optical module has a built-in wavelength division multiplexer, and the wavelength division multiplexer is configured to: when a wavelength of a lightwave bearing the uplink optical signal is a first wavelength, send the uplink optical signal to a first Media Access Control (MAC) module, or when a wavelength of a lightwave bearing the uplink optical signal is a second wavelength, send the uplink optical signal to a second MAC module, where the uplink optical signal carries ONU authentication information; the first MAC module, configured to receive the uplink optical signal, extract the ONU authentication information, and transmit the ONU authentication information to a processor; the second MAC module, configured to receive the uplink optical signal, extract the ONU authentication information, and transmit the ONU authentication information to the processor; the processor, configured to determine whether the ONU authentication information is consistent with ONU authentication information preconfigured by the OLT, where if the ONU authentication information is consistent with the ONU authentication information preconfigured by the OLT, an ONU is registered successfully; and a memory, configured to store the ONU authentication information preconfigured by the OLT.

With reference to the first aspect, in a first possible implementation manner of the first aspect, the ONU authentication information includes an ONU type, and the ONU type is used to uniquely identify a MAC protocol supported by the ONU.

With reference to the first aspect or the first possible implementation manner of the first aspect, in a second possible implementation manner, the OLT further includes: at least two serializers/deserializers, where a first serializer/deserializer has one end connected to the optical module and one end connected to the first MAC module, and is configured to convert the uplink optical signal into parallel data that the first MAC module can process; and a second serializer/deserializer has one end connected to the optical module and one end connected to the second MAC module, and is configured to convert the uplink optical signal into parallel data that the second MAC module can process.

With reference to the first aspect or either possible implementation manner of the first aspect, in a third possible implementation manner, the processor is further configured to: when the ONU authentication information is inconsistent with the ONU authentication information configured by the OLT, if a type, configured by the OLT, of the ONU is an adaptive type, record the ONU authentication information.

With reference to the third possible implementation manner of the first aspect, in a fourth possible implementation manner, when the OLT supports the adaptive type, the ONU is registered successfully.

With reference to the first aspect or any possible implementation manner of the first aspect, in a fifth possible implementation manner, the processor is further configured to configure a service parameter for the successfully registered ONU, where the service parameter includes an ONU-ID, a TCONT-ID, and a GEM port ID.

With reference to the fifth possible implementation manner of the first aspect, in a sixth possible implementation manner, the configuring a service parameter for the successfully registered ONU specifically includes:

configuring a logical ID for the ONU;

accessing a service parameter mapping table, where the service parameter mapping table is used to store a mapping relationship between a physical ID of the ONU and a logical ID of the ONU; and allocating the physical ONU ID corresponding to the logical ONU ID to the ONU according to the service parameter mapping table.

With reference to the fifth possible implementation manner of the first aspect, in a seventh possible implementation manner, the configuring a service parameter for the successfully registered ONU specifically includes:

allocating a physical ID, which is configured by a user, to the ONU, where a range of a physical ID of the ONU-ID is 0 to 127, a range of a physical ID of the TCONT-ID is 0 to 4095, and a range of a physical ID of the GEM port ID is 0 to 4095.

According to a second aspect, an ONU registration method is provided, where the method is applied to a passive optical network PON system, the passive optical network PON system includes an optical line terminal OLT and multiple optical network units, a first optical network unit uses a first MAC protocol, and a second optical network unit uses a second MAC protocol, including: receiving an uplink optical signal, where the uplink optical signal carries ONU authentication information;

sending the optical signal to a MAC module separately according to a wavelength of uplink light;

extracting, by the MAC module, the ONU authentication information, and sending the extracted ONU authentication information to a processor; and receiving, by the processor, the ONU authentication information, and determining whether the ONU authentication information is consistent with ONU authentication information preconfigured by the OLT, where if the ONU authentication information is consistent with the ONU authentication information preconfigured by the OLT, an ONU is registered successfully.

With reference to the second aspect, in a first possible implementation manner of the second aspect, the ONU authentication information includes an ONU type, and the ONU type is used to uniquely identify a MAC protocol supported by the ONU.

With reference to the second aspect or the first possible implementation manner of the second aspect, in a second possible implementation manner, when the ONU authentication information is inconsistent with the ONU authentication information configured by the OLT, and if the type, configured by the OLT, of the ONU is an adaptive type, the ONU authentication information is recorded.

With reference to the second possible implementation manner of the second aspect, in a third possible implementation manner, when the OLT supports the adaptive type, the ONU is registered successfully.

With reference to the second aspect, in a fourth possible implementation manner, the method further includes: configuring a service parameter for the successfully registered ONU, where the service parameter includes an ONU-ID, a TCONT-ID, and a GEM port ID.

With reference to the fourth possible implementation manner of the second aspect, in a fifth possible implementation manner, the configuring a service parameter for the successfully registered ONU specifically includes:

configuring a logical ID for the ONU;

accessing a service parameter mapping table, where the service parameter mapping table is used to store a mapping relationship between a physical ID of the ONU and a logical ID of the ONU; and allocating the physical ONU ID corresponding to the logical ONU ID to the ONU according to the service parameter mapping table.

With reference to the fourth possible implementation manner of the second aspect, in a sixth possible implementation manner, the configuring a service parameter for the successfully registered ONU specifically includes:

allocating a physical ID, which is configured by a user, to the ONU, where a range of a physical ID of the ONU-ID is 0 to 127, a range of a physical ID of a TCONT is 0 to 4095, and a range of a physical ID of a GEM port is 0 to 4095.

According to a third aspect, a passive optical network PON system is provided, including an optical line terminal OLT, at least one first ONU, and one second ONU, where the first ONU and the second ONU support different MAC protocols, and the OLT is connected to the first ONU and the second ONU by using an optical distribution network, where the optical line terminal OLT includes the OLT according to the first aspect or any possible implementation manner of the first aspect.

According to a fourth aspect, an optical line terminal OLT is provided, including: a service processing module, configured to: when service congestion occurs, send a backpressure request message to a passive optical network PON port dynamic bandwidth allocation DBA module; and the PON port DBA module, configured to receive the backpressure request message from the service processing module, and perform backpressure on a DBA module with a low priority according to a backpressure priority, where the DBA module at least includes two DBA submodules, where the DBA submodule with the lower priority in the DBA module receives the backpressure request message, and performs processing.

With reference to the fourth aspect, in a first possible implementation manner, the backpressure priority is configured according to a network management system, or a command line, or a pre-stored backpressure priority table.

With reference to the fourth aspect or the first possible implementation manner of the fourth aspect, in a second possible implementation manner, the backpressure priority includes a DBA path priority or a transmission container T-CONT priority.

With reference to the second possible implementation manner of the fourth aspect, in a third possible implementation manner, when the backpressure priority is the transmission container T-CONT priority, the OLT further includes a memory, configured to store information about a mapping relationship between the T-CONT priority and a DBA submodule to which the T-CONT belongs.

With reference to the third possible implementation manner of the fourth aspect, in a fourth possible implementation manner, the PON port DBA module is specifically configured to:

when the backpressure priority is the DBA path priority, reduce, by the PON port DBA module, total uplink bandwidth allocated by a local PON port, where a decrease may be passed in by the PON port DBA module, or may be set by a user by configuring different threshold values, or the DBA submodule automatically reduces uplink bandwidth; and when the backpressure priority is the T-CONT priority, perform backpressure on the DBA submodule to which the T-CONT with the low priority belongs, where when receiving the backpressure request message, the DBA submodule performs backpressure on the T-CONT.

With reference to the fourth possible implementation manner of the fourth aspect, in a fifth possible implementation manner, the DBA submodule reduces a value of allocated uplink bandwidth of the T-CONT, where a decrease may be passed in by the PON port DBA module, or may be set by a user by configuring different threshold values.

According to a fifth aspect, a backpressure method is provided, including: receiving a backpressure request message; and performing backpressure on a dynamic bandwidth allocation DBA module with a low priority according to a backpressure priority.

With reference to the fifth aspect, in a first possible implementation manner of the fifth aspect, the backpressure priority is configured according to a network management system, a command line, or a pre-stored backpressure priority table.

With reference to the fifth aspect, in a second possible implementation manner of the fifth aspect, the backpressure priority includes a DBA path priority or a transmission container T-CONT priority.

With reference to the second possible implementation manner of the fifth aspect, in a third possible implementation manner, when the backpressure priority is the DBA path priority, uplink bandwidth allocated by a local PON port is reduced, where a decrease may be passed in by the PON port DBA module, or may be set by a user by configuring different threshold values, or the DBA submodule automatically reduces uplink bandwidth.

With reference to the second possible implementation manner of the fifth aspect, in a fourth possible implementation manner, when the backpressure priority is the T-CONT priority, backpressure is performed on a DBA submodule to which a T-CONT with a low priority belongs; and when receiving the backpressure request message, the DBA submodule performs backpressure on the T-CONT.

With reference to the fourth possible implementation manner of the fifth aspect, in a fifth possible implementation manner, before backpressure is performed on the DBA submodule to which the T-CONT with the low priority belongs, the method further includes:

accessing an information table of a mapping relationship between the T-CONT priority and the DBA submodule to which the T-CONT belongs, to acquire the DBA submodule to which the T-CONT with the low priority belongs.

According to the ONU registration method used by this embodiment of the present invention, a processor performs uniform registration management on a GPON ONU and an XG-PON ONU, thereby simplifying an ONU registration process and improving efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
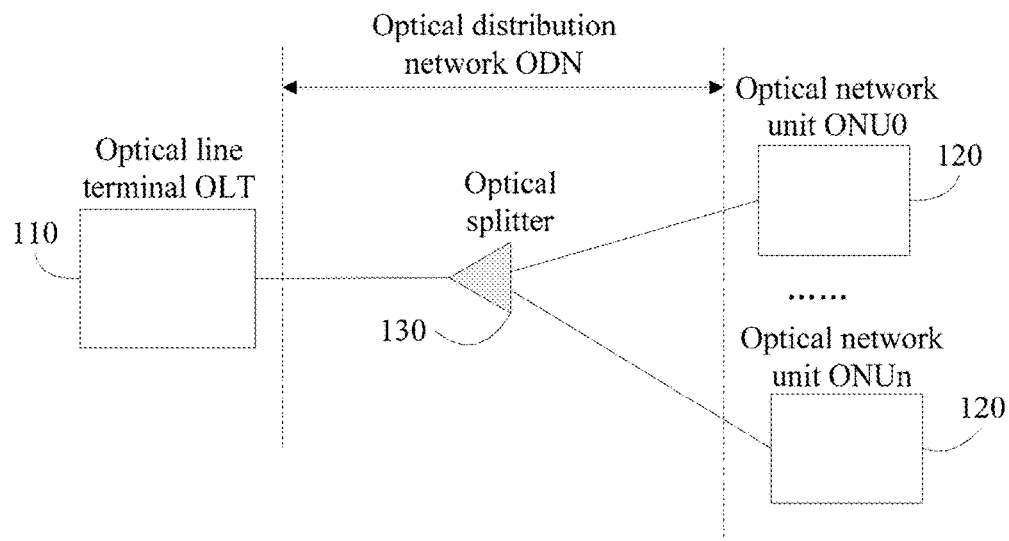
FIG. 1 is a diagram of a network architecture of a PON system.

Referring to FIG. 1, FIG. 1 is a schematic diagram of a network architecture of a passive optical network PON system. The passive optical network system 100 includes at least one optical line terminal (OLT) 110, multiple optical network units (ONU) 120, and one optical distribution network (ODN) 130. The optical line terminal 110 is connected to the multiple optical network units 120 in a point-to-multipoint form by using the optical distribution network 130. Communication between the optical line terminal 110 and the optical network units 120 may be performed by using a time division multiplexing (TDM) mechanism, a wavelength division multiplexing (WDM) mechanism, or a TDM/WDM combined mechanism. A direction from the optical line terminal 110 to the optical network units 120 is defined as a downlink direction, and a direction from the optical network units 120 to the optical line terminal 110 is an uplink direction.

The passive optical network system 100 may be a communications network that implements data distribution between the optical line terminal 110 and the optical network units 120 without any active device, and the data distribution between the optical line terminal 110 and the optical network units 120 may be implemented by using a passive optical device (for example, an optical splitter) in the optical distribution network 130. The passive optical network system 100 may be a gigabit-capable passive optical network (GPON) system defined by ITU-T G984 series standards, an Ethernet passive optical network EPON system defined by an IEEE 802.3ah standard, a wavelength division multiplexing passive optical network WDM PON system, or a next generation passive optical network (NG-PON) system, for example, an XG-PON system defined by ITU-T G987 series standards, a 10G-EPON system defined by an IEEE 802.3av standard, a TDM/WDM combined PON system, and the like. Various passive optical network systems defined by the foregoing standards are incorporated herein by reference in their entireties.

The optical line terminal 110 is generally located in a central location (for example, a central office Central Office (CO)), and the optical line terminal 110 can uniformly manage the multiple optical network units 120. The optical line terminal 110 may serve as a medium between the optical network units 120 and an upper layer network (not shown in the figure), forward data received from the upper layer network as downlink data to the optical network units 120, and forward uplink data received from optical network units 120 to the upper layer network.

The optical network units 120 may be disposed in user side locations (for example, at customer premises) in a distributed manner. The optical network unit 120 may be a network device configured to communicate with the optical line terminal 110 and a user. Specifically, the optical network unit 120 may serve as a medium between the optical line terminal 110 and the user, for example, the optical network unit 120 may forward downlink data received from the optical line terminal 110 to the user, and forward data received from the user as uplink data to the optical line terminal 110.

The optical distribution network 130 may be a data distribution system, which may include an optical fiber, an optical coupler, an optical multiplexer/demultiplexer, an optical splitter, and/or another device. In addition, the optical distribution network 130 may further include one or more processing devices, for example, an optical amplifier or a repeater device. In a branch structure shown in FIG. 1, the optical distribution network 130 may specifically extend from the optical line terminal 110 to the multiple optical network units 120, but may also be configured to be any other point-to-multipoint structure.

Currently, the PON system has been widely applied in the world; the NG-PON is a PON with a higher rate, and is a direction for future evolution of the PON. The PON system and the XG-PON system may coexist for quite a long period of time. For example, the GPON system coexists with the XG-PON system, the EPON system coexists with the XG-PON system, or even the GPON system coexists with a PON system of another type (such as the EPON system, or a PON system with a higher rate). The following embodiments further describe the present invention in detail by using an example in which the GPON system coexists with the XG-PON system. Architectures in which other PON systems coexist are not described in the present invention one by one, reference may be made to descriptions of the GPON system and the XG-PON system, and the architectures shall also be protected by the present invention.

Figure 2A:
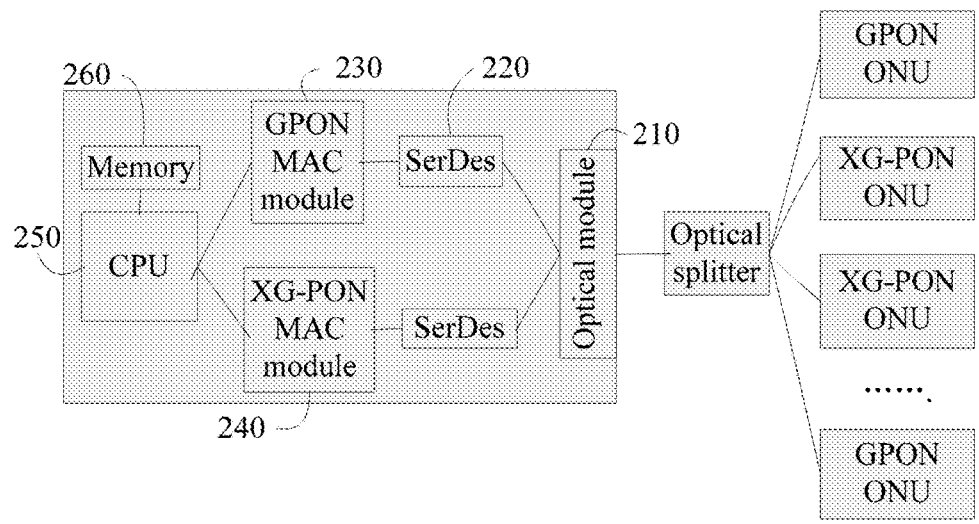
FIG. 2a is a diagram of a network architecture in which a GPON system and an XG-PON system coexist according to an embodiment of the present invention.
Figure 2B:
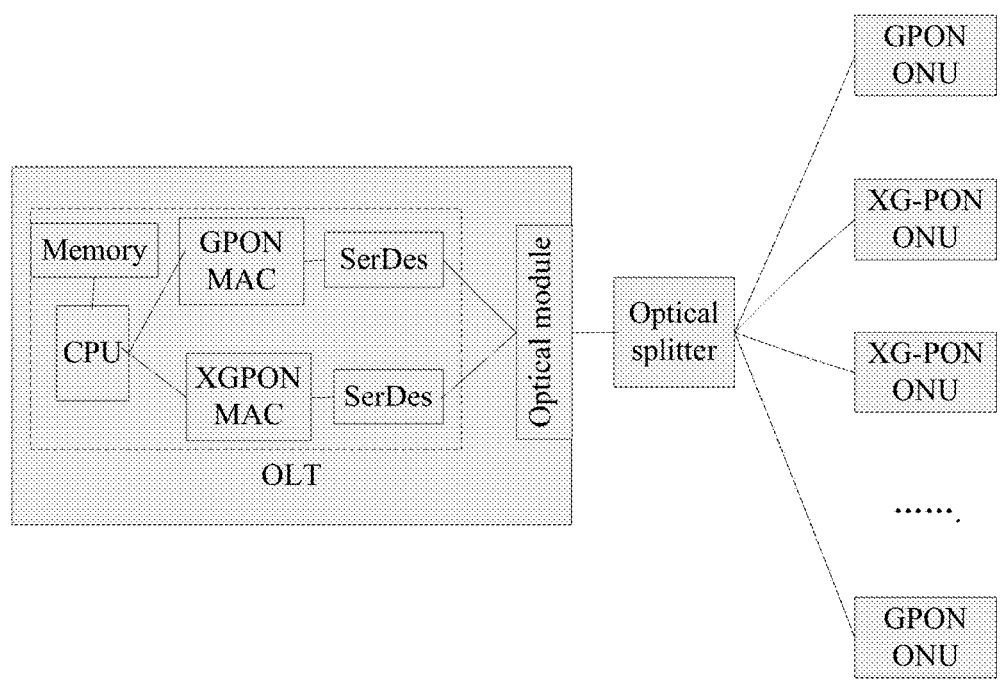
FIG. 2b is another diagram of a network architecture in which a GPON system and an XG-PON system coexist according to an embodiment of the present invention.

FIG. 2a and FIG. 2b both are diagrams of system architectures in which a GPON and an XG-PON coexist according to an embodiment of the present invention. As shown in FIG. 2a and FIG. 2b, a GPON ONU and an XG-PON ONU are connected to a same PON port (not shown in the figure) of a same OLT by using a same optical splitter. The PON port is a downlink port of the OLT, for example, one OLT includes ten slots, four to eight PON ports are disposed in each slot, and each PON port may provide a 1:32 or 1:64 optical splitter to split light, that is, each PON port may be connected to 32 or 64 ONUs.

Specifically, the PON port is a user side interface of the OLT, and is a part of an optical module, where the PON port has a built-in wavelength division multiplexer (WDM), and the WDM is configured to complete lightwave demultiplexing and multiplexing.

As shown in FIG. 2a, the optical line terminal OLT 20 includes an optical module 210 (which is also referred to as an optical-to-electrical converter), a GPON MAC module 230, an XG-PON MAC module 240, and a processor 250.

Optionally, the optical line terminal OLT further includes: at least two serializers/deserializers 220 (SERializer/DESerializer, briefly referred to as SerDes), where the SerDeses have one end connected to the optical module 210 and one end connected to the GPON MAC module 230 or the XG-PON MAC module 240, and are configured to complete conversion between serial data of the optical module 210 and parallel data of the MAC module (the GPON MAC module or the XG-PON MAC module) separately.

Optionally, the optical line terminal OLT further includes a memory 260, configured to store ONU management information, such as various tables, service data, and temporary data. The memory may be a high-speed RAM memory, may be a register, or may be a non-volatile memory (non-volatile memory), for example, a flash memory flash, or at least one magnetic disk memory.

As shown in FIG. 2b, a memory 260, a processor 250, a GPON MAC module 230, an XG-PON MAC module 240, serializers/deserializers 220 may be located on different physical entities separately, or may be integrated in one physical entity, and the physical entity may be a field-programmable gate array (FPGA), or an application specific integrated circuit (ASIC), or a system on chip (SoC), or a central processing unit (CPU), or a network processor (NP), or a digital signal processor (DSP), or a microcontroller unit (MCU), or a programmable logic device (PLD), or another integrated chip.

Specifically, the optical module 210 includes an optical transmitter, an optical receiver, and a WDM. The optical module is configured to perform optical-to-electrical conversion. The optical transmitter converts an electrical signal into an optical signal, and transmits the optical signal to an ODN, and the optical signal is transferred to an ONU by using an optical fiber. The optical receiver is configured to receive an optical signal from the ODN network, convert the optical signal into a digital electrical signal, and transmit the digital electrical signal to a serializer/deserializer 220 for further processing. The WDM is configured to combine downlink lightwaves into one lightwave, and transmit the lightwave to an ONU by using the ODN; or divide an uplink optical signal into multiple lightwaves, and transmit the multiple lightwaves to different MAC modules separately for processing.

Generally, a commonly used optical module includes a GBIC (Gigabit Interface Converter), an SFP (Small-Form factor Pluggable) optical module, an SFP+, an XFP (10 Gigabit Small Form-Factor Pluggable) optical module, an SFF, and the like.

In a system in which a GPON and an XG-PON coexist, there is an independent serializer/deserializer on each of a GPON link and an XG-PON link, as shown in FIG. 2a or FIG. 2b. To meet a need for PON uplink time division multiplexing, the SerDes 220 has an integrated function of burst mode clock and data recovery (BCDR) for uplink.

The MAC modules (the GPON MAC module 230 and the XG-PON MAC module 240 are collectively referred to as the MAC modules) are configured to implement functions such as ONU management, DBA (Dynamic Bandwidth Allocation), ONU registration, and data transmission and receiving.

The MAC module may be implemented by using a hardware circuit, or may be implemented by using a software program, and in a more common manner, is implemented by combing hardware and software, for example, a field-programmable gate array (FPGA), or an application specific integrated circuit (ASIC), or a system on chip SoC), or a central processing unit (CPU), or a network processor (Network Processor, NP), or a digital signal processor (DSP), or a micro controller unit (MCU), or a programmable logic device (PLD), or another integrated chip.

The processor 250 is configured to implement an ONU registration function by processing data transferred by the MAC module.

The following describes an ONU registration process in detail with reference to specific application scenarios.

Embodiment 1

This embodiment of the present invention provides an ONU registration method, where the method may be applied to a system in which a GPON and an XG-PON coexist and that is shown in FIG. 2a or FIG. 2b, and the method includes:

First, before an ONU is powered on for registration, ONU information needs to be configured on an OLT end.

Configuration of the ONU information specifically includes: adding the ONU to an OLT, and specifying a type of the ONU, where types of an ONU include three types: a GPON ONU, an XG-PON ONU, and an Auto-ONU (which is also referred to as an adaptive ONU), and the Auto-ONU type means that the ONU type may be a GPON ONU, or may be an XG-PON ONU.

Optionally, the adding the ONU to an OLT may use a command line manner or use a network management system input manner.

Specifically, that the ONU is added by using the command line manner is used as an example, and a command line includes:

ONU add portid [ONUid] password-auth password-value {always-on|once-on {no-aging|aging-time time-out} } omci { ONU-lineprofile-id profile-id| ONU-lineprofile-name profile-name} {ONU-srvprofile-id| profile-id ONU-srvprofile-name profile-name} [ONU-type { GPON XG-PON auto}] [Desc describe-value] [ONU-LOID LOID-value], where portid is used to specify a port ID of a PON port on which a newly added ONU is located;

ONUid is used to specify an ONU ID, which is an optional parameter, and if the ONU ID is not specified, a system automatically allocates a smallest idle ONU ID of the current port;

a password-auth parameter is used in two ways:

when password-auth password-value is directly input after portid [ONUid], it indicates that a password authentication manner is selected; in this case, immediately after inputting of password-auth password-value, always-on or once-on also needs to be selected to set a discovery mode; and in the password authentication manner, the OLT determines whether a password reported by the ONU is consistent with configured ONU information, where if the password reported by the ONU is consistent with the configured ONU information, authentication succeeds, and the ONU goes online normally; and when password-auth password-value is input after sn-auth sn-value is input, it indicates an authentication manner of the ONU is specified as a serial number and password authentication manner; and in the serial number and password authentication manner, the OLT determines whether a serial number and a password that are reported by the ONU are consistent with the configured ONU information, where if the serial number and the password that are reported by the ONU are consistent with the configured serial number and password, authentication succeeds, and the ONU goes online normally;

Always-on is a discovery mode for password authentication, and for details, reference may be made to the prior art, which is not described herein again;

Once-on is another discovery mode for the password authentication, and for details, reference may be made to the prior art, which is not described herein again;

No-aging: when the ONU is in the Once-on mode, no timeout time is set, and the password authentication may be performed all the time;

Aging-time: when the ONU is in the once-on mode, a timeout time is set, it is required that password authentication is performed within a predetermined time for the ONU, and no authentication is permitted beyond the time;

Sn-auth is a serial number authentication manner, and when in this mode, the OLT determines whether a serial number reported by the ONU is consistent with the configured ONU information, where if the serial number reported by the ONU is consistent with the configured ONU information, authentication succeeds;

ONU-lineprofile-name: an ONU line profile is bound for the ONU by specifying a name of the ONU line profile;

ONU-lineprofile-id: an ONU line profile is bound for the ONU by specifying an ID of the ONU line profile;

ONU-srvprofile-name: an ONU service profile is bound for the ONU by specifying a name of the ONU service profile;

ONU-srvprofile-id: an ONU service profile is bound for the ONU by specifying an ID of the ONU service profile;

Omci is used to indicate that the OLT performs remote operation and configuration management on the ONU by using an OMCI protocol;

ONU-type is used to indicate the ONU type.

Desc is used to add description information for the ONU; and ONU-LOID is used to indicate a logical ONU ID.

Figure 3A:
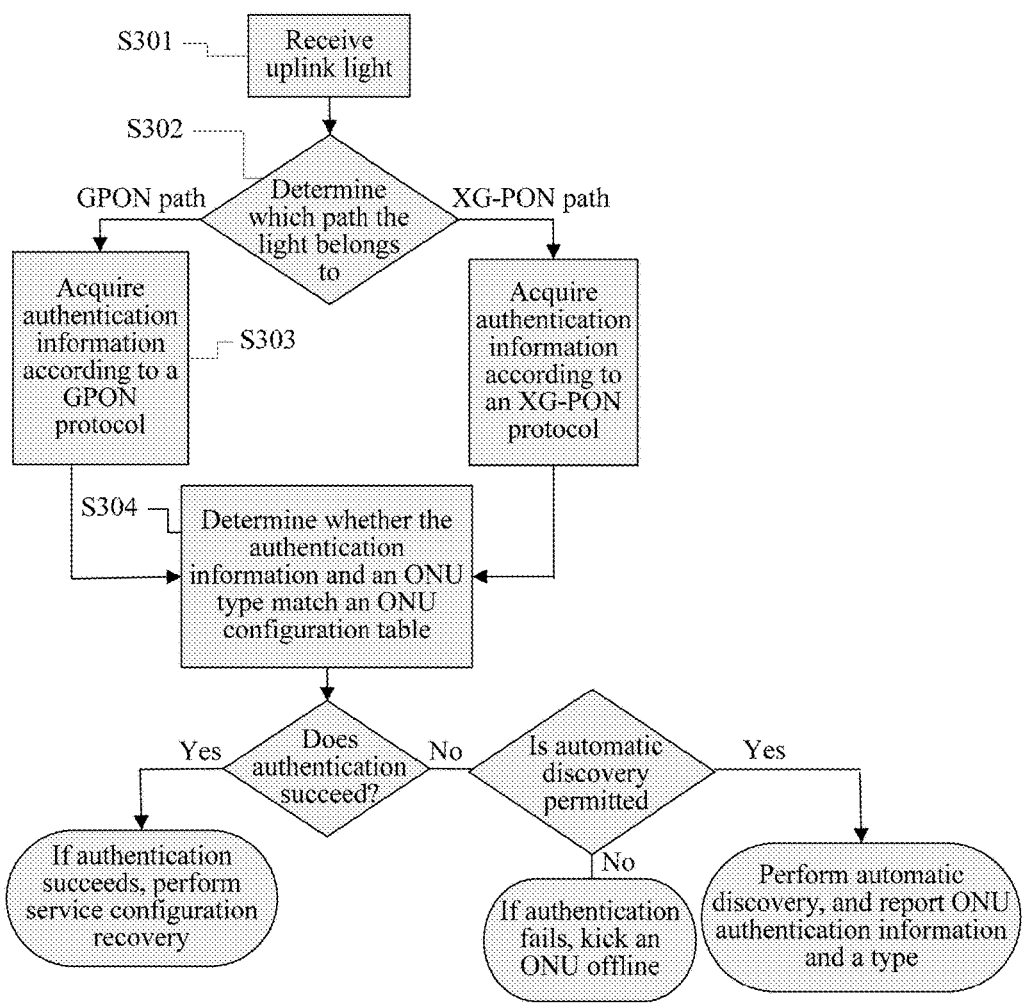
FIG. 3a is a flowchart of an ONU registration method according to an embodiment of the present invention.

After the ONU is added to the OLT, the OLT delivers an ONU registration request message periodically; when powered on, an ONU responds to the ONU registration request message, and reports authentication information of the ONU, as shown in FIG. 3a, specifically including:

S301: The OLT receives an uplink optical signal, where the uplink optical signal carries ONU authentication information.

The ONU authentication information includes the ONU type, where the ONU type is either of two types: a GPON ONU and an XG-PON ONU.

Optionally, the ONU authentication information may further carry a serial number (SN) and/or password (when authentication manners are different, carried authentication information differs), and may further include other logical authentication information, such as a logical ONU ID (LOID).

It should be noted that when the authentication manner configured by the OLT is the first using manner mentioned in the password-auth parameter, the ONU authentication information only needs to carry the password; and when the authentication manner configured by the OLT is the second using manner mentioned in the password-auth parameter, the ONU authentication information needs to carry the SN and the password, and only when both are consistent with ONU information configured by the OLT, the authentication succeeds. This embodiment of the present invention uses the sn-auth authentication manner as an example.

Notably, when the ONU is added on the OLT side, the type of the ONU further includes an adaptive auto type, but the ONU type in the authentication information reported by the ONU can only be either of two types: the GPON ONU and the XG-PON ONU.

For example, after a GPON ONU reports an SN of the ONU and the ONU type, the OLT receives the authentication information, and matches the received authentication information with authentication information pre-stored in a configuration table on the OLT side; when the ONU type corresponding to the matching SN is the an auto type, it indicates that the ONU type may be the GPON ONU, or may be the XG-PON ONU.

S302: According to a wavelength of an uplink lightwave, send the uplink optical signal to a GPON MAC module through a GPON path, or send the uplink optical signal to an XG-PON MAC module through an XG-PON path.

Specifically, if the uplink wavelength is shorter than 1300 nanometers, the uplink optical signal is transmitted to the XG-PON MAC module through the XG-PON path, and if an uplink wavelength is longer than 1300 nm, the uplink optical signal is transmitted to the GPON MAC module through the GPON path.

The GPON path refers to a physical path between a wavelength division multiplexer WDM, a SerDes, and the GPON MAC module, and the XG-PON path refers to a physical path between a wavelength division multiplexer WDM, a SerDes (another SerDes, not the one on the GPON path), and the XG-PON MAC module; because the WDM, SerDes, and MAC module may be integrated into one physical entity, the two paths may also be logical paths.

An optical module of the OLT has the built-in wavelength division multiplexer WDM, so that the WDM may perform demultiplexing according to the wavelength of the uplink signal; if the uplink wavelength is 1260 to 1280 nm, the WDM transmits the uplink signal to the XG-PON MAC module through the XG-PON path; and if the uplink wavelength is 1300 to 1320 nm, the WDM transmits the uplink signal to the GPON MAC module through the GPON path.

Optionally, before the WDM transmits the uplink signal to the XG-PON MAC module, the WDM transmits the uplink signal to the serializer/deserializer to complete conversion of serial data to parallel data of the MAC module, and the serializer/deserializer transmits the converted data to the XG-PON MAC module.

S303: After acquiring ONU registration information, the XG-PON MAC module extracts the authentication information, and sends the authentication information to a CPU; or after acquiring the ONU registration information, the GPON MAC module extracts the authentication information, and sends the authentication information to a CPU.

S304: Receive the ONU authentication information, and determine whether the authentication information is consistent with ONU authentication information configured by the OLT, where if the authentication information is consistent with the ONU authentication information configured by the OLT, authentication on the ONU succeeds; if the authentication information is inconsistent with the ONU authentication information configured by the OLT, authentication on the ONU fails, and proceed to step S305.

Optionally, the ONU authentication information may be stored in a tabular form in a memory, or may be stored in another form known in the prior art.

That the ONU authentication information is stored in the tabular form is used as an example, and as shown in Table. 1, the ONU authentication information may be stored in a register, or a flash memory, or a ROM, or a RAM, or another memory that are of the OLT.

TABLE 1

ONU authentication information table

| Number | ONU Type | SN |
|---|---|---|
| 1 | GPON ONU | 1000 |
| 2 | GPON ONU | 1001 |

TABLE 1-continued

ONU authentication information table

| Number | ONU Type | SN |
|---|---|---|
| 3 | XG-PON ONU | 1002 |
| 4 | XG-PON ONU | 1003 |
| 5 | Adaptive type | 1004 |
| 6 | Adaptive type | 1005 |

As shown in Table 1, the ONU types include three types: the GPON ONU, XG-PON ONU, and adaptive type. The adaptive type refers to that the ONU type may be the XG-PON ONU or the GPON ONU. When a type reported by the ONU is inconsistent with the type in the preconfigured ONU authentication information table, the ONU is not permitted to go online. The GPON ONU reports the SN and the ONU type, and the OLT determines whether the reported information is consistent with the information in Table 1, where if the reported information is consistent with the information in Table 1, it is determined that the GPON ONU is an authorized ONU, and registration succeeds; if the reported information is inconsistent with the information in Table 1, proceed to step S305.

Notably, the GPON ONU reports the SN and the ONU type, and if the ONU type, corresponding to the SN, on the OLT side is the adaptive type, it is processed as a case of inconsistency, and proceed to step S305.

Step S305: If both the SN and the ONU type that are reported by the ONU are inconsistent with the information configured by the OLT, kick the ONU offline; and when the ONU authentication information is inconsistent with the ONU authentication information preconfigured by the OLT, and if the type, configured by the OLT, of the ONU is the adaptive type, record the ONU authentication information. When the OLT supports the adaptive type, and the serial number and/or password corresponding to the ONU of the adaptive type is consistent with the serial number and/or password preconfigured by the OLT, the ONU is registered successfully.

Notably, whether the OLT supports an automatic discovery function is related to an actual configuration of the OLT; because different OLTs have different specific configurations, some OLTs support the automatic discovery function, but some OLTs do not support the automatic discovery function.

Figure 3B:
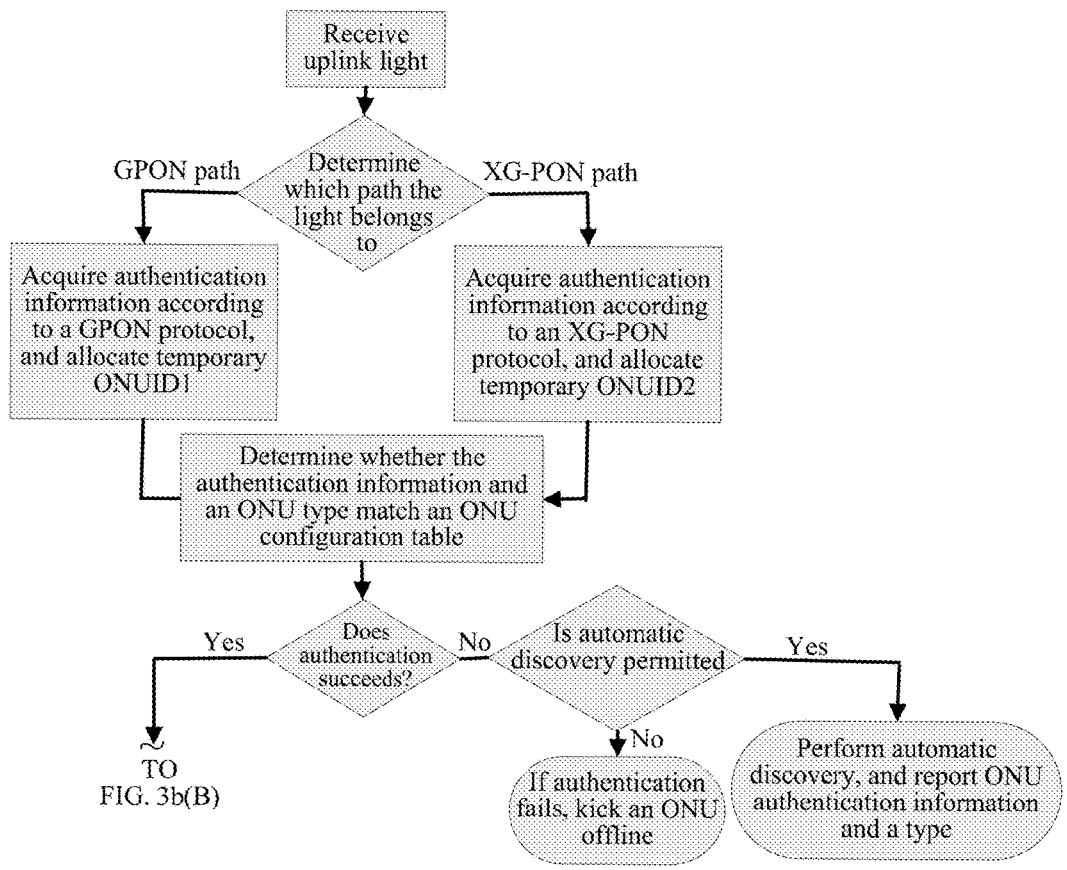
FIG. 3b(A) and FIG. 3b(B) are a flowchart of an ONU registration method according to an embodiment of the present invention.
Figure 3B:
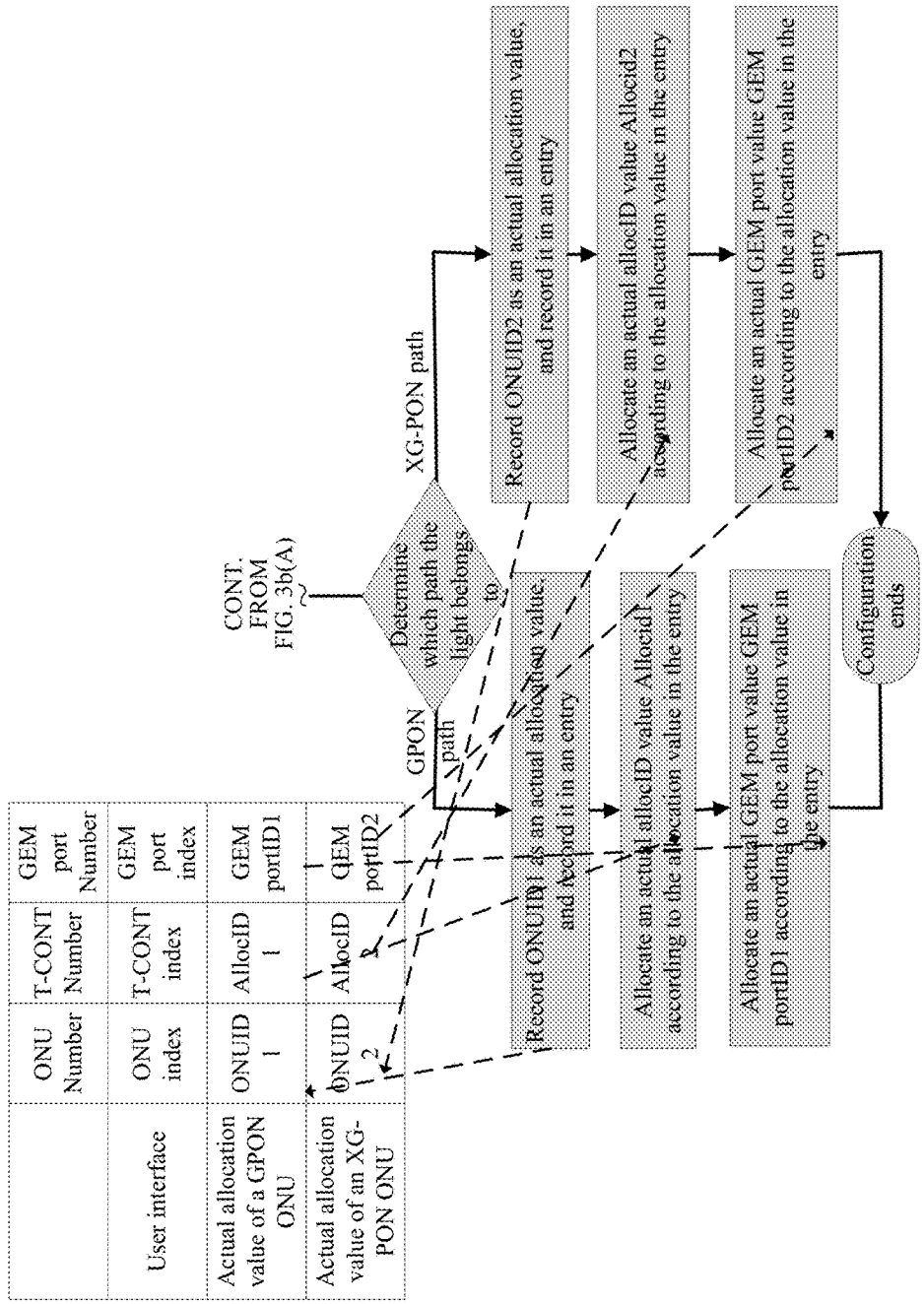
Figure 3C:
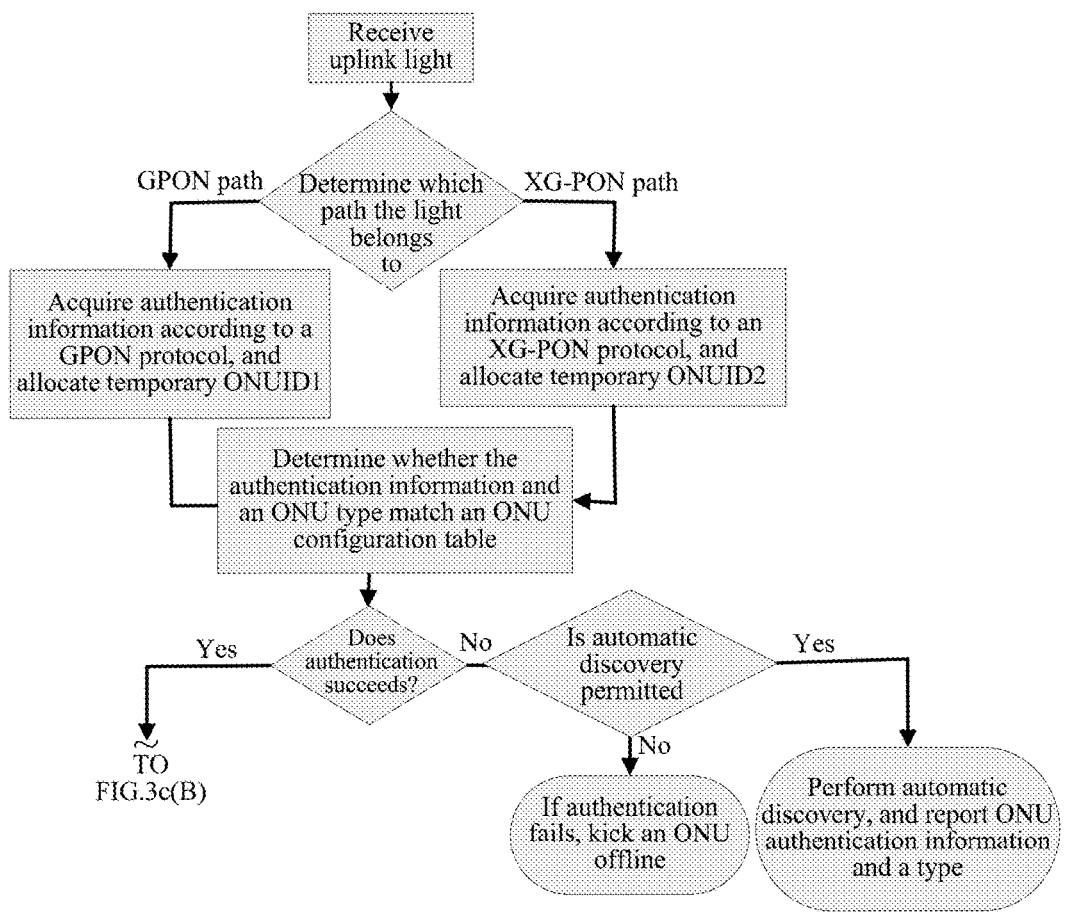
FIG. 3c(A) and FIG. 3c(B) are a flowchart of another ONU registration method according to an embodiment of the present invention.
Figure 3C:
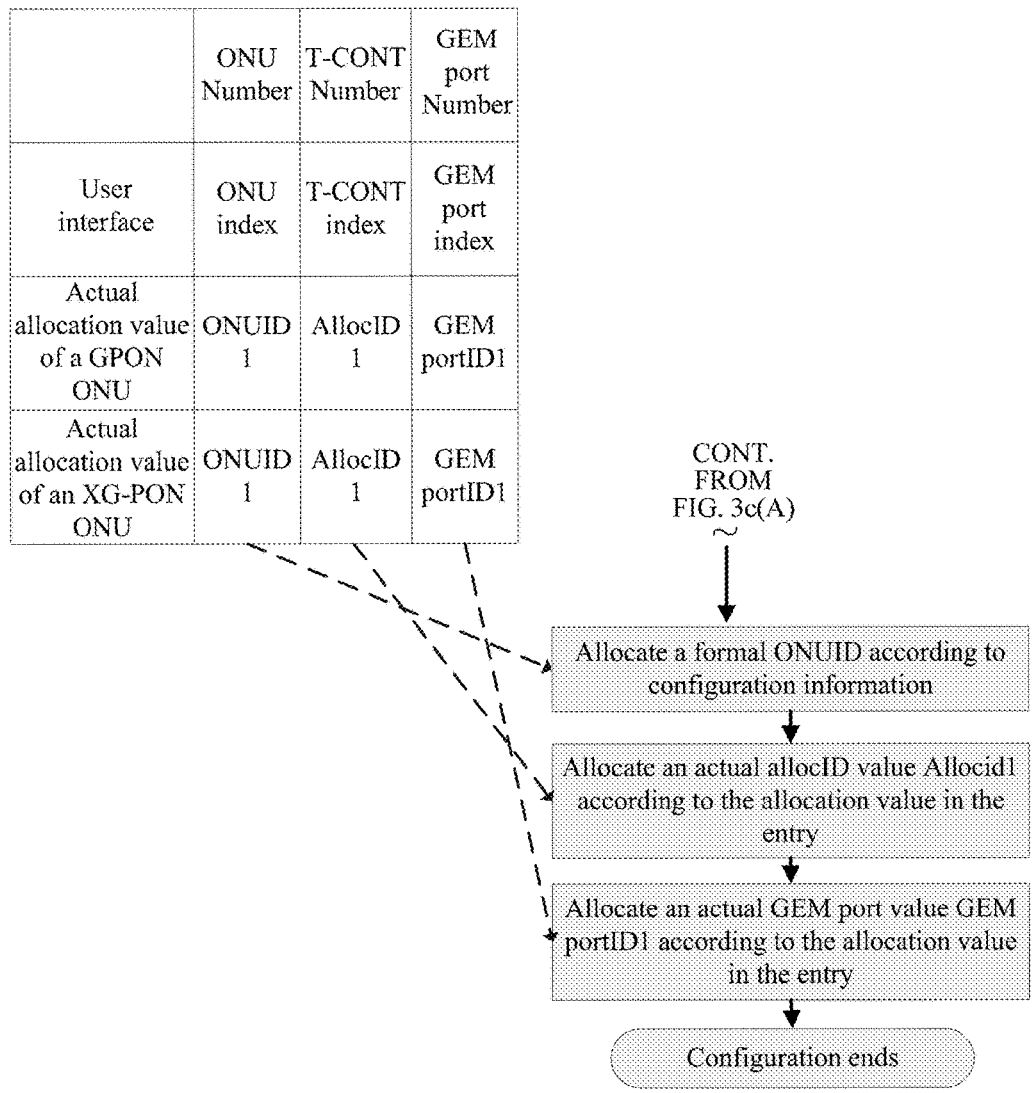

The method further includes: after the ONU is registered successfully, configuring, by the OLT, a parameter for the authorized ONU, as shown in FIG. 3b(A) and FIG. 3b(B).

Specifically, the configuring a parameter for the authorized ONU includes two manners, and the first manner is:

A configuration interface uses a same type of ID, that is, when the parameter is configured by using the network management system or the command line, a logical ID LOID is used in all cases. When the OLT interacts with the ONU, a real physical ID is used, where there is a mapping relationship between the physical ID and the logical ID, and a related mapping relationship information table is shown as follows.

As shown in Table 2, for example, an ONU ID mapping relationship table is (data in the table is only for convenience of exemplification, and actual data may not be in the format or be the ID):

TABLE 2

ONU-ID mapping relationship table

| Logical ID | Physical ID |
|---|---|
| ONU 10000 | ONU ID = 1 |
| ONU 10001 | ONU ID = 2 |
| ONU 10002 | ONU ID = 3 |
| ONU 10003 | ONU ID = 4 |

The logical IDs ONU 10000, ONU 10001 . . . are IDs used in the configuration interface, and the physical ID is a physical ID used when the OLT exchanges a message with the ONU, for example, 1 is a GPON ONU-ID, 2 is an XG-PON ONU-ID, 3 is an XG-PON ONU-ID, and 4 is a GPON ONU-ID.

Similarly, Table 3 is a TCONT (Transmission Container, transmission container) ID mapping relationship table, as shown in Table 3:

TABLE 3

TCONT ID mapping relationship table:

| Logical ID | Physical ID |
|---|---|
| TCONT 20000 | Alloc ID = 1 |
| TCONT 20001 | Alloc ID = 2 |
| TCONT 20002 | Alloc ID = 3 |
| TCONT 20003 | Alloc ID = 4 |

The logical IDs TCONT 20000, TCONT 20001 . . . are a same type of ID used in the configuration interface; and when the OLT interacts with the ONU, the physical ID is used, that is, Alloc ID1, Alloc ID2 . . . ; and Table 3 is used to implement mapping between the physical ID and the logical ID.

Similarly, Table 4 is a GEM port (GPON Encapsulation Method port) ID mapping relationship table, as shown in Table 4:

TABLE 4

GEM port ID mapping relationship table:

| Logical ID | Physical ID |
|---|---|
| GEM 30000 | GEM port ID = 1 |
| GEM 30001 | GEM port ID = 2 |
| GEM 30002 | GEM port ID = 3 |
| GEM 30003 | GEM port ID = 4 |

The logical IDs GEM 30000, GEM 30001 . . . are a same type of ID used in the configuration interface; and when the OLT interacts with the ONU, the physical ID is used, that is, GEM port ID1, GEM port ID2 . . . ; and Table 4 is used to implement mapping between the physical ID and the logical ID.

ONU parameter IDs of the GPON ONU and the XG-PON ONU may use a full range defined by a standard, and parameter IDs of the GPON ONU and the XG-PON ONU are not required to be consistent.

A CPU determine, according to the ONU type, whether the authorized ONU is a GPON ONU or an XG-PON ONU; if the authorized ONU is a GPON ONU, the GPON MAC module allocates ONU ID1 to the ONU; and if the authorized ONU is an XG-PON ONU, the XG-PON MAC module allocates ONU ID2 to the ONU.

Similarly, the Alloc ID and the GEM port ID are allocated to the ONU.

Specifically, configuring a service parameter for the successfully registered ONU includes:

configuring a logical ID for the ONU;

accessing a service parameter mapping table, where the service parameter mapping table is used to store a mapping relationship between a physical ID of the ONU and a logical ID of the ONU; and allocating the physical ID corresponding to the logical ID to the ONU according to the service parameter mapping table, where the logical ID includes an ONU-ID, a GEM port ID, and an Alloc ID.

Figure 4:
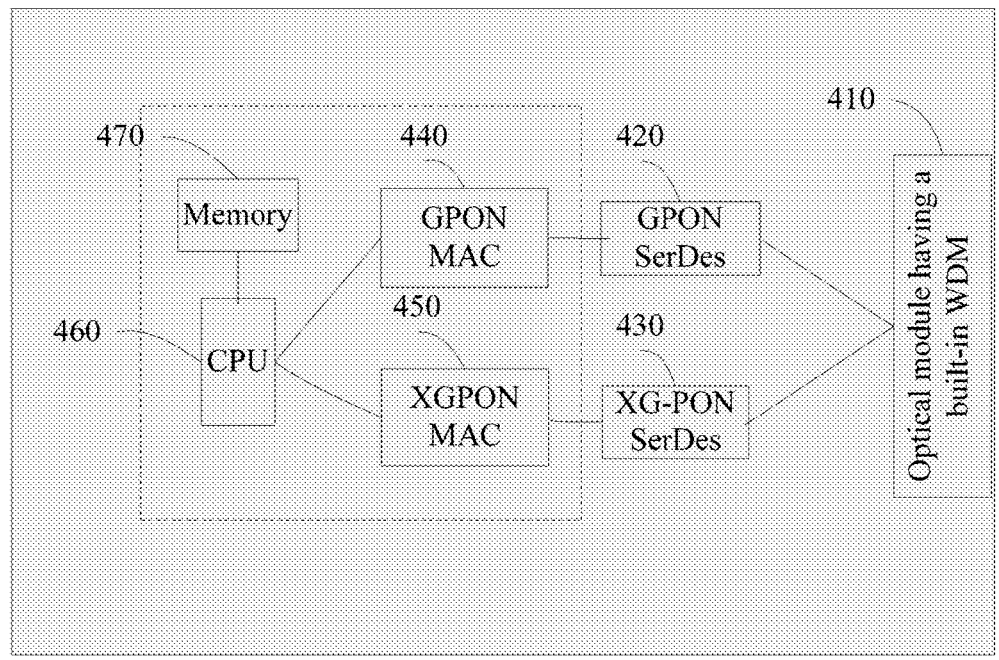
FIG. 4 is a schematic structural diagram of an OLT according to an embodiment of the present invention.

As shown in FIG. 4, the second manner is:

An ID used in a user interface and an ID used for message exchange with the ONU are a same type of ID, and an intersection of ID ranges of the GPON and XG-PON is used. In this solution, no further internal conversion is required, an ID configured by a user and an ID used for message exchange with the ONU are consistent, as shown in Table 5.

TABLE 5

ONU parameter configuration table

| | ONU-ID Number | TCONT ID | GEM port ID |
|---|---|---|---|
| ID range of a user interface/ID range of message exchange with an ONU | 0 to 127 | 0 to 4095, where 1024 to 4095 may be used by a service | 0 to 4095, where 1024 to 4095 may be used by a service |
| ID range of a GPON standard | 0 to 253 | 0 to 4095, where 256 to 4095 may be used by a service | 0 to 4095, where 256 to 4095 may be used by a service |
| ID range of an XG-PON standard | 0 to 1022 | 0 to 65535, where 1024 to 65535 may be used by a service | 0 to 65535, where 1024 to 65535 may be used by a service |

In this manner, the CPU allocates a formal ONU-ID, Alloc ID, and GEM port ID to the authorized ONU according to the information in Table 5.

Specifically, configuring a service parameter for the successfully registered ONU includes:

allocating a physical ID, which is configured by the user, to the ONU, where a range of a physical ID of the ONU-ID is 0 to 127, a range of a physical ID of the TCONT-ID is 0 to 4095, and a range of a physical ID of the GEM port ID is 0 to 4095.

According to the ONU registration method used by this embodiment of the present invention, a processor performs uniform registration management on a GPON ONU and an XG-PON ONU, thereby simplifying an ONU registration process and improving efficiency.

Embodiment 2

This embodiment of the present invention provides an optical line terminal OLT, configured to execute the ONU registration method described in Embodiment 1; and referring to FIG. 4, the OLT 40 includes an optical module 410, a GPON MAC module 440, an XG-PON MAC module 450, and a processor 460.

The optical module 410 has a built-in wavelength division multiplexer, and is configured to receive an uplink optical signal, and transmit the optical signal to different paths according to a wavelength of an uplink wave, where the uplink optical signal carries ONU authentication information.

Specifically, the optical module 410 includes an optical receiver, an optical transmitter, and the WDM, where the optical receiver is configured to receive the uplink optical signal;

the optical transmitter is configured to transmit a downlink optical signal; and the WDM is configured to transfer the uplink optical signal to different MAC modules separately according to the wavelength of uplink wave, where if an uplink wavelength is 1300 to 1320 nanometers, the uplink optical signal is transmitted to the GPON MAC module through a GPON path, and if an uplink wavelength is shorter than 1300 nm, the uplink optical signal is transmitted to the XG-PON MAC module through an XG-PON path.

Before being transferred to a MAC module, the optical signal further needs to go through a serializer/deserializer, and the serializer/deserializer is configured to complete conversion between serial data of the optical module and parallel data of the MAC module.

After acquiring the ONU authentication information, the GPON MAC module 440 extracts the ONU authentication information, and sends the ONU authentication information to the processor 460.

After acquiring the ONU authentication information, the XG-PON MAC module 450 extracts the ONU authentication information, and sends the ONU authentication information to the processor 460.

The processor 460 receives the ONU authentication information, and determines whether the authentication information is consistent with ONU authentication information configured by the OLT, where if the authentication information is consistent with the ONU authentication information configured by the OLT, authentication on an ONU succeeds; if the authentication information is inconsistent with the ONU authentication information configured by the OLT, authentication on the ONU fails.

Optionally, the OLT further includes: a GPON serializer/deserializer 420, an XG-PON serializer/deserializer 430, and a memory 470.

The GPON serializer/deserializer 420 has one end connected to the optical module 410 and one end connected to the GPON MAC module 440, and is configured to receive a signal output by the optical module 410, complete the conversion between the serial data and the parallel data, and transmit the converted data to the GPON MAC module.

The XG-PON serializer/deserializer 430 has one end connected to the optical module 410 and one end connected to the XG-PON MAC module 450, and is configured to receive a signal output by the optical module 410, complete the conversion between the serial data and the parallel data, and transmit the converted data to the XG-PON MAC module.

Optionally, the ONU authentication information configured by the OLT may be configured by the OLT by using a network management system, or may be configured by using a command line.

The ONU authentication information may be stored in a tabular form in the memory, or may be stored in another form known in the prior art.

That the ONU authentication information is stored in the tabular form is used as an example, and as shown in Table. 1, the ONU authentication information may be stored in a register, or a flash memory, or a ROM, or a RAM, or another memory that are of the OLT.

TABLE 1

| ONU authentication information table | | |
|---|---|---|
| Number | ONU Type | SN |
| 1 | GPON ONU | 1000 |
| 2 | GPON ONU | 1001 |
| 3 | XG-PON ONU | 1002 |
| 4 | XG-PON ONU | 1003 |
| 5 | Adaptive type | 1004 |
| 6 | Adaptive type | 1005 |

For example, ONU types include three types: the GPON ONU, XG-PON ONU, and adaptive type. The ONU type means that: when a type reported by the ONU is inconsistent with a type in the preconfigured ONU authentication information table, the ONU is not permitted to go online. The adaptive type refers to that the ONU type may be the XG-PON ONU or the GPON ONU. After the GPON ONU reports an SN and/or a Password, whether the reported information is consistent with the information in Table 1 is determined, where if the reported information is consistent with the information in Table 1, it is determined that the GPON ONU is an authorized ONU; if the reported information is inconsistent with the information in Table 1, it is determined that the ONU is unauthorized.

The processor 460 is further configured to perform parameter configuration for the authorized ONU.

After the ONU is registered successfully, the OLT configures a parameter for the authorized ONU, as shown in FIG. 3b(A) and FIG. 3b(B).

Specifically, the configuring a parameter for the authorized ONU includes two manners, and the first manner is:

A configuration interface uses a same type of ID, that is, when the parameter is configured by using the network management system or the command line, a logical ID LOID is used in all cases. When the OLT interacts with the ONU, a real physical ID is used, where there is a mapping relationship between the physical ID and the logical ID, and a related mapping relationship information table is shown as follows.

As shown in Table 2, for example, an ONU ID mapping relationship table is (data in the table is only for convenience of exemplification, and actual data may not be in the format or be the ID):

TABLE 2

| ONU-ID mapping relationship table | |
|---|---|
| Logical ID | Physical ID |
| ONU 10000 | ONU ID = 1 |
| ONU 10001 | ONU ID = 2 |
| ONU 10002 | ONU ID = 3 |
| ONU 10003 | ONU ID = 4 |

The logical IDs ONU 10000, ONU 10001 . . . are IDs used in the configuration interface, and the physical ID is a physical ID used when the OLT exchanges a message with the ONU, for example, 1 is a GPON ONU-ID, 2 is an XG-PON ONU-ID, 3 is an XG-PON ONU-ID, and 4 is a GPON ONU-ID.

Similarly, Table 3 is a TCONT ID mapping relationship table, as shown in Table 3:

TABLE 3

| TCONT ID mapping relationship table: | |
|---|---|
| Logical ID | Physical ID |
| TCONT 20000 | Alloc ID = 1 |
| TCONT 20001 | Alloc ID = 2 |
| TCONT 20002 | Alloc ID = 3 |
| TCONT 20003 | Alloc ID = 4 |

The logical IDs TCONT 20000, TCONT 20001 . . . are a same type of ID used in the configuration interface; and when the OLT interacts with the ONU, the physical ID is used, that is, Alloc D1, Alloc ID2 . . . ; and Table 3 is used to implement mapping between the physical ID and the logical ID.

Similarly, Table 4 is a GEM port ID mapping relationship table, as shown in Table 4:

TABLE 4

| GEM port ID mapping relationship table: | |
|---|---|
| Logical ID | Physical ID |
| GEM 30000 | GEM port ID = 1 |
| GEM 30001 | GEM port ID = 2 |
| GEM 30002 | GEM port ID = 3 |
| GEM 30003 | GEM port ID = 4 |

The logical IDs GEM 30000, GEM 30001 . . . are a same type of ID used in the configuration interface; and when the OLT interacts with the ONU, the physical ID is used, that is, GEM port ID1, GEM port ID2 . . . ; and Table 4 is used to implement mapping between the physical ID and the logical ID.

ONU parameter IDs of the GPON ONU and the XG-PON ONU may use a full range defined by a standard, and parameter IDs of the GPON ONU and the XG-PON ONU are not required to be consistent.

A CPU determines, according to the ONU type, whether the authorized ONU is a GPON ONU or an XG-PON ONU; if the authorized ONU is a GPON ONU, the GPON MAC module allocates ONU ID1 to the ONU; and if the authorized ONU is an XG-PON ONU, the XG-PON MAC module allocates ONU ID2 to the ONU.

Similarly, the Alloc ID and the GEM port ID are allocated to the ONU.

Optionally, configuring a service parameter for the successfully registered ONU specifically includes:

configuring a logical ID for the ONU;

accessing a service parameter mapping table, where the service parameter mapping table is used to store a mapping relationship between a physical ID of the ONU and a logical ID of the ONU; and allocating the physical ID corresponding to the logical ID to the ONU according to the service parameter mapping table.

As shown in FIG. 4, the second manner is:

An ID used in a user interface and an ID used for message exchange with the ONU are a same type of ID, and an intersection of ID ranges of the GPON and XG-PON is used. In this solution, no further internal conversion is required, an ID configured by a user and an ID used for message exchange with the ONU are consistent, as shown in Table 5.

TABLE 5

| ONU parameter configuration table | | | |
|---|---|---|---|
| | ONU-ID Number | TCONT ID | GEM port ID |
| ID range of a user interface/ID range of message exchange with an ONU | 0 to 127 | 0 to 4095, where 1024 to 4095 may be used by a service | 0 to 4095, where 1024 to 4095 may be used by a service |
| ID range of a GPON standard | 0 to 253 | 0 to 4095, where 256 to 4095 may be used by a service | 0 to 4095, where 256 to 4095 may be used by a service |
| ID range of an XG-PON standard | 0 to 1022 | 0 to 65535, where 1024 to 65535 may be used by a service | 0 to 65535, where 1024 to 65535 may be used by a service |

In this manner, the CPU allocates a formal ONU-ID, Alloc ID, and GEM port ID to the authorized ONU according to the information in Table 5.

Optionally, configuring a service parameter for the successfully registered ONU specifically includes:

allocating a physical ID, which is configured by the user, to the ONU, where a range of a physical ID of the ONU-ID is 0 to 127, a range of a physical ID of the TCONT-ID is 0 to 4095, and a range of a physical ID of the GEM port ID is 0 to 4095.

The processor 460 is further configured to: if the ONU is an unauthorized ONU, if the OLT permits automatic discovery, report that a new ONU goes online, and store the ONU authentication information in the ONU authentication information table; if the OLT does not permit automatic discovery, kick the ONU offline.

The memory 470 is configured to store the foregoing ONU authentication information table, ONU configuration information table, and ONU parameter configuration table; and if the information is not stored in the tabular form, the information may also be stored in the memory in another form in the prior art.

The OLT provided by this embodiment of the present invention performs uniform registration management on a GPON ONU and an XG-PON ONU, thereby simplifying an ONU registration process and improving efficiency.

Embodiment 3

This embodiment of the present invention provides a passive optical network system PON, which includes an optical line terminal OLT, an optical distribution network ODN, and at least two optical network units ONUs, where the at least two optical network units ONUs use different MAC protocols separately, and the optical line terminal OLT is connected to the at least two optical network units ONUs by using the optical distribution network ODN. The optical line terminal is the optical line terminal described according to Embodiment 1.

Embodiment 4

In a system in which a GPON and an XG-PON coexist, traffic of transmission containers (Transmission container, briefly referred to as T-CONT) of the GPON and traffic of T-CONTs of the XG-PON need to undergo multiple levels of traffic convergence. First, the traffic of all the T-CONTs of the GPON converges on a GPON path, and the traffic of all the T-CONTs of the XG-PON converges on an XG-PON path; and then, all the traffic on the GPON path and all the traffic on the XG-PON path converge on a PON port; and traffic on the PON port is further forwarded to an upper level service processing module. When service congestion occurs in the upper level service processing module, backpressure is performed on the PON port. A GPON DBA (Dynamic Bandwidth Allocation) module takes the transmission containers T-CONTs as a managed object; the T-CONT dynamically receives authorization delivered by an OLT, to manage uplink bandwidth allocation at a PON transmission convergence layer, and to improve uplink bandwidth in a PON system.

In this embodiment of the present invention, based on an existing DBA module, one level of PON port DBA module is added, and the PON port DBA module uniformly manages the GPON path and the XG-PON path. This embodiment of the present invention provides two implementation solutions, where the first one is: PON DBA is based on a path granularity (as shown in FIG. 6b). When the service processing module performs backpressure, the PON port DBA module performs backpressure on a path according to a backpressure priority configured by a user; after receiving a backpressure indication signal, a path DBA module (including a GPON path DBA module or an XG-PON path DBA module) reduces total uplink bandwidth allocated by a local PON port. A decrease may be passed in by the PON port DBA module, or may be set by the user by configuring different threshold values, or uplink bandwidth may be automatically reduced by using DBA until backpressure is cancelled. After the service processing module cancels the backpressure, the PON port DBA module cancels backpressure on the path DBA module, and in this case, the path DBA module returns to an original allocation mechanism.

The second method is: The PON port DBA is based on a T-CONT granularity (as shown in FIG. 8b). When the service processing module performs backpressure, the PON port DBA module performs backpressure on a single T-CONT or some T-CONTs according to a backpressure priority configured by a user. After receiving a backpressure indication signal, a path DBA module (including a GPON path DBA module or an XG-PON path DBA module) reduces allocated uplink bandwidth of a corresponding T-CONT. A decrease may be passed in by the PON port DBA module, or may be set by the user by configuring different threshold values. When the service processing module cancels the backpressure, the PON port DBA module cancels T-CONT based DBA backpressure at the same time, and in this case, the T-CONT returns to an original allocation mechanism.

The following describes the two implementation solutions in detail.

Figure 5:
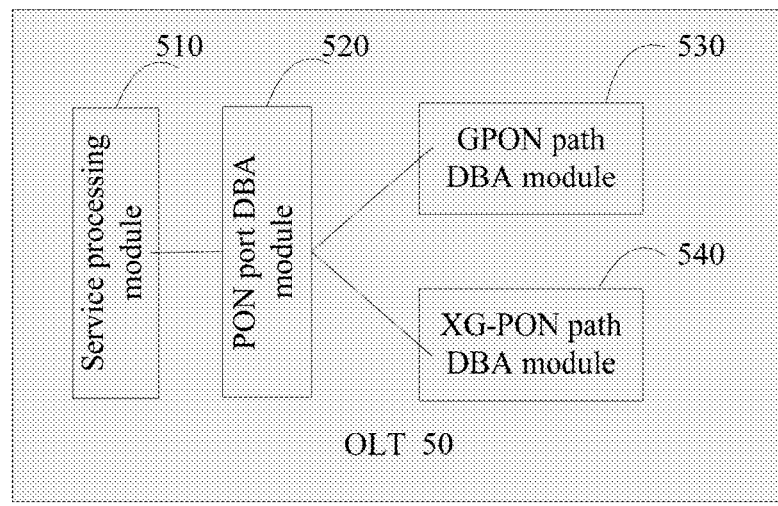
FIG. 5 is a schematic structural diagram of another OLT according to an embodiment of the present invention.

An embodiment of the present invention provides an optical line terminal OLT 50, which is configured to implement dynamic bandwidth allocation (DBA) backpressure and applied to a system in which a GPON and an XG-PON coexist and that is shown in FIG. 2; and as shown in FIG. 5, the apparatus includes: a service processing module 510 and a PON port DBA module 520.

The service processing module 510 is configured to: when service congestion occurs, send a backpressure request message or a backpressure indication signal to a PON port DBA module 520.

Specifically, when the service processing module 510 detects the congestion, the service processing module 510 sends the backpressure request message to the PON port DBA module 520.

Whether service congestion occurs may be determined according to whether traffic received by the service processing module 510 exceeds an upper limit that the service processing module 510 can process.

The backpressure request message may be sent by means of a Pause message packet defined by 802.3.

A packet format of the backpressure request message may be an existing Pause packet format, or may be a user-defined packet format.

The PON port DBA module 520 is configured to: after receiving the backpressure request message sent by the service processing module 510, perform backpressure on a PON path DBA module according to a backpressure priority, where the PON path DBA module includes a GPON path DBA module 530 and an XG-PON path DBA module 540.

Optionally, the backpressure priority may be configured by using a network management system or a command line according to user needs. For example, a user may configure that a priority of a GPON path is 0, and a priority of an XG-PON path is 1, that is, the priority of the XG-PON path is higher than the priority of the GPON path.

Optionally, the PON port DBA module 520 may further write priority information of the GPON path and the XG-PON path to a database and store the priority information in a related memory, or set priority information of the GPON path and the XG-PON path by means of external input.

For example, the priority of the GPON path is 0, and the priority of the XG-PON path is 1; the priority of the GPON path is lower; and when performing backpressure, the service processing module transfers the backpressure indication signal to the GPON path DBA module.

The GPON path DBA module 530 is configured to: when the priority of the GPON path is lower, receive the backpressure indication signal sent by the PON port DBA module 520, and reduce total uplink bandwidth allocated by a local PON port.

A decrease may be input externally by the PON port DBA module 520, or may be set by the user by configuring different threshold values, or uplink bandwidth may be automatically reduced by using the GPON path DBA module 530 until backpressure is cancelled.

The XG-PON path DBA module 540 is configured to: when the priority of the GPON path is lower, receive the backpressure indication signal sent by the PON port DBA module 520, and reduce total uplink bandwidth allocated by a local PON port.

A decrease may be passed in by the PON port DBA module 520, or may be set by the user by configuring different threshold values, or uplink bandwidth may be automatically reduced by using the XG-PON path DBA module 540 until backpressure is cancelled.

DBA is implemented in MAC; the foregoing service processing module 510, PON port DBA module 520, GPON path DBA module 530, and XG-PON path DBA module 540 may be integrated in one physical chip, or may be located in different physical chips separately, where the physical chip may be a field-programmable gate array (FPGA), or may be an application specific integrated circuit (ASIC), or may be a system on chip (SoC), or may be a central processing unit (CPU), or may be a network processor (NP), or may be a digital signal processor (DSP), or may be a microcontroller unit (MCU), or may be a programmable logic controller (PLD), or another integrated chip.

According to this embodiment of the present invention, a PON port DBA module uniformly manages a GPON path and an XG-PON path, so that when service congestion occurs, a backpressure processing process can be simplified and efficiency can be improved.

Embodiment 5

Figure 6A:
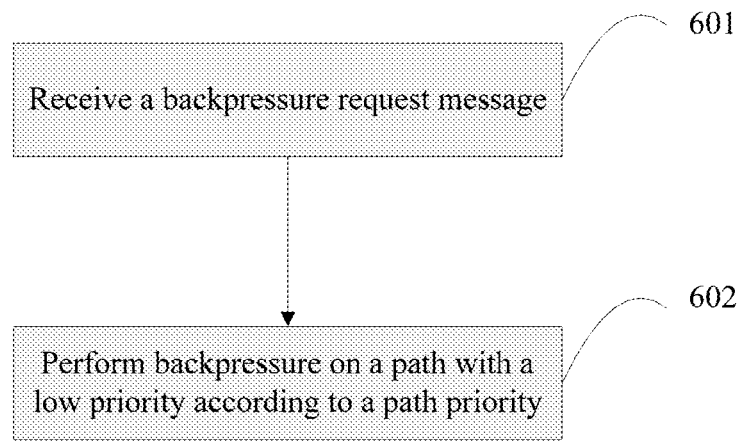
FIG. 6a is a flowchart of a backpressure implementation method according to an embodiment of the present invention.
Figure 6B:
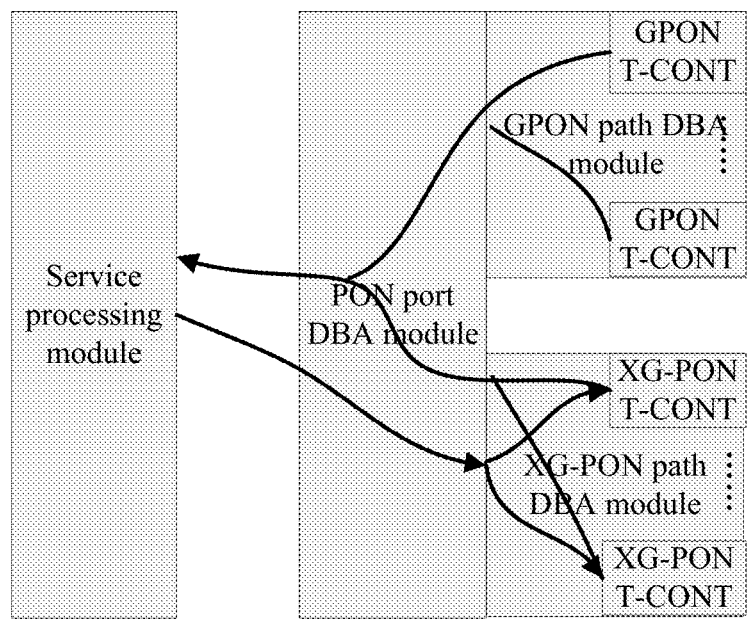
FIG. 6b is a schematic diagram of path based DBA backpressure according to an embodiment of the present invention.

This embodiment of the present invention provides a dynamic bandwidth allocation DBA backpressure method, which is applied to a system in which a GPON and an XG-PON coexist and that is shown in FIG. 2, and as shown in FIG. 6, the method includes:

S601: Receive a backpressure request message.

Specifically, when encountering service congestion, a service processing module sends the backpressure request message to a PON port DBA module, and the PON port DBA module receives the backpressure request message.

S602: Perform backpressure on a PON path according to a backpressure priority configured by a user.

The PON path includes a GPON path and an XG-PON path, and the backpressure priority may be configured according to a network management system, or a command line, or a pre-stored backpressure priority table.

A congestion detection method may be that: congestion occurs in an uplink egress, or that the service processing module receives a backpressure message from another module connected to the service processing module.

The backpressure request message may be sent by means of a pause message packet defined by 802.3.

A packet format of the backpressure request message may be an existing pause packet format, or may be a user-defined packet format.

After receiving the backpressure request message or a backpressure indication signal, the PON path DBA module reduces total uplink bandwidth allocated by a local PON port.

A decrease may be passed in by the PON port DBA module, or may be set by the user by configuring different threshold values, or uplink bandwidth may be automatically reduced by using the path DBA until backpressure is cancelled.

Optionally, when an upper layer module cancels the backpressure, the PON port DBA module cancels backpressure on the path DBA module at the same time, and in this case, the path DBA module returns to an original allocation mechanism.

Embodiment 6

Figure 7:
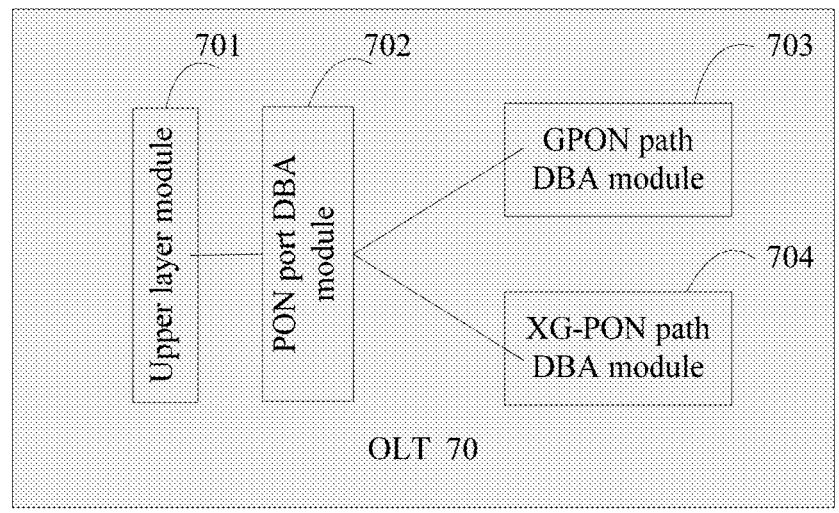
FIG. 7 is a schematic structural diagram of another OLT according to an embodiment of the present invention.

This embodiment of the present invention further provides a dynamic bandwidth allocation DBA backpressure method, which is applied to a system in which a GPON and an XG-PON coexist and that is shown in FIG. 2, and as shown in FIG. 7, the method includes:

S701: Receive a backpressure request message.

S702: Perform backpressure on a T-CONT according to a backpressure priority configured by a user.

Optionally, the priority of the T-CONT may be configured according to a network management system, or a command line, or a pre-stored backpressure priority table.

Specifically, when a service processing module performs the backpressure, a PON port DBA module performs backpressure on a single T-CONT or multiple T-CONTs according to the backpressure priority configured by the user; and before performing backpressure, the PON port DBA module needs to access a memory storing information about a mapping between the priorities of T-CONTs and DBA submodules to which the T-CONTs belong, to acquire a DBA module to which a T-CONT with a lower priority belongs.

After receiving a backpressure indication signal, a path DBA module reduces allocated uplink bandwidth of a corresponding T-CONT.

A decrease may be passed in by the PON port DBA module, or may be set by the user by configuring different threshold values.

Optionally, when an upper layer module cancels the backpressure, the PON port DBA module cancels T-CONT based DBA backpressure at the same time, and in this case, the T-CONT returns to an original allocation mechanism.

Embodiment 7

Figure 8A:
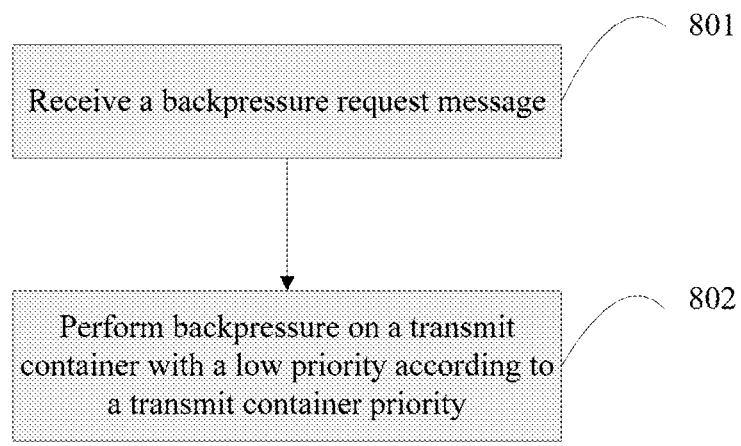
FIG. 8a is a flowchart of another backpressure implementation method according to an embodiment of the present invention.
Figure 8B:
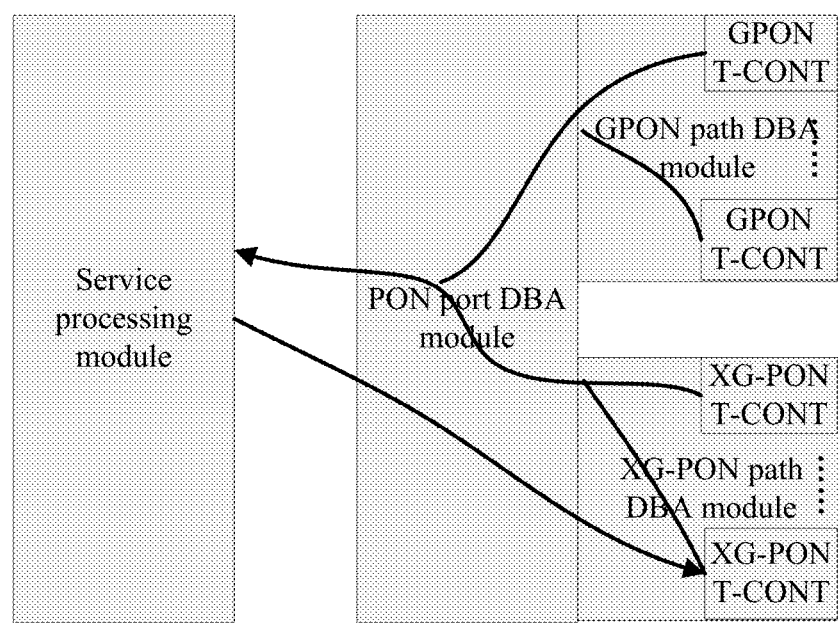
FIG. 8b is a schematic diagram of T-CONT based DBA backpressure according to an embodiment of the present invention.

This embodiment of the present invention further provides an apparatus for implementing dynamic bandwidth allocation DBA backpressure, and the apparatus is applied to a system in which a GPON and an XG-PON coexist and that is shown in FIG. 2, and as shown in FIG. 8, includes: a service processing module 801, a PON port DBA module 802, and a GPON path DBA module 803, and an XG-PON path DBA module 804.

The service processing module 801 is configured to: when service congestion occurs, send a backpressure request message to the PON port DBA module 802.

Optionally, when determining whether the service congestion occurs, the service processing module 801 may determine whether the number of received services exceeds an upper limit that the service processing module 801 can process, or another alarm module may send an alarm notification, or the service processing module 801 may determine, in a manner recorded in the prior art, whether the service congestion occurs.

The service processing module 801 may be implemented by using a hardware circuit, may be implemented by using a software program, or may be implemented in a manner of combining a software program and a hardware circuit.

The backpressure request message may be sent by means of a pause message packet defined by 802.3x.

A packet format of the backpressure request message may be an existing pause packet format, or may be a user-defined packet format.

The PON port DBA module 802 has one end connected to the service processing module 801 and one end connected to path DBA modules, and is configured to: receive the backpressure request message from the service processing module 801, and perform backpressure on a single T-CONT or multiple T-CONTs according to a backpressure priority configured by a user; and when the upper layer module 801 cancels the backpressure, cancel T-CONT based DBA backpressure at the same time.

One DBA path includes multiple T-CONTs.

Backpressure priorities, configured by the user, of T-CONTs may be configured by using a command line or a network management system, or may be configured by using a pre-stored backpressure priority table, for example, Table 6:

TABLE 6

Backpressure priority table

| Priority | T-CONT ID | Corresponding DBA Path |
|---|---|---|
| 0 | T-CONT100 | GPON path |
| 2 | T-CONT200 | XG-PON path |
| 1 | T-CONT300 | GPON path |
| 2 | T-CONT400 | XG-PON path |

The backpressure reduces pressure by reducing the number of service packets of T-CONTs; each decrease for pressure reduction may be automatically controlled by a PON port DBA module, for example, each decrease is 20% of a total number, or each decrease is 10 frames, or each decrease is 2 frames/microsecond; or each decrease for pressure reduction may be set by configuring a threshold value by using the command line or the network management system.

The GPON path DBA module 803 is configured to: when a T-CONT with a lower priority belongs to a GPON path, when receiving a backpressure indication signal sent by the PON port DBA module 802, reduce allocated uplink bandwidth of the corresponding T-CONT.

The XG-PON path DBA module 804 is configured to: when a T-CONT with a lower priority belongs to an XG-PON path, when receiving a backpressure indication signal sent by the PON port DBA module 802, reduce allocated uplink bandwidth of the corresponding T-CONT.

DBA is implemented in MAC; the foregoing service processing module 801, PON port DBA module 802, GPON path DBA module 803, and XG-PON path DBA module 804 may be integrated in one physical chip, or may be located in different physical chips separately, where the physical chip may be a field-programmable gate array (FPGA), or may be an application specific integrated circuit (ASIC), or may be a system on chip (SoC), or may be a central processor unit (CPU), or may be a network processor (Network Processor, NP), or may be a digital signal processor (DSP), or may be a micro controller unit (MCU), or may be a programmable logic device (PLD), or another integrated chip.

Embodiment 8

This embodiment of the present invention provides a passive optical network (PON) system, which includes an optical line terminal (OLT), an optical distribution network ODN, and at least two optical network units (ONUs), where the at least two optical network units (ONUs) use different MAC protocols separately, and the optical line terminal (OLT) is connected to the at least two optical network units (ONUs) by using the optical distribution network (ODN). The optical line terminal is the optical line terminal described according to Embodiment 4 or Embodiment 7.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical line terminal (OLT), wherein the OLT comprises:
    a passive optical network (PON) port, wherein the PON port is connected to a first group of optical network units (ONUs) and a second group of ONUs, wherein the first group of ONUs comprises at least one ONU and the second group of ONUs comprises at least one ONU, wherein a backpressure priority of the first group of ONUs is lower than a backpressure priority of the second group of ONUs;
a non-transitory memory comprising instructions; and
a processor coupled to the non-transitory memory;
wherein the instructions, when executed by the processor, facilitate:
when upstream service congestion occurs, reducing a value of total uplink bandwidth allocated by the PON port to the first group of ONUs.

2. The OLT according to claim 1, wherein the backpressure priority of the first group of ONUs and the backpressure priority of the second group of ONUs are pre-stored in a backpressure priority table.

3. The OLT according to claim 1, wherein the first group of ONUs comprises a first ONU and a second ONU, wherein a backpressure priority of the first ONU is lower than a backpressure priority of the second ONU; and
wherein the instructions, when executed by the processor, further facilitate:
reducing a value of allocated uplink bandwidth of a transmit container (T-CONT) corresponding to the first ONU according to the backpressure priority of the first ONU.

4. A method, comprising:
when upstream service congestion occurs, reducing, by an optical line terminal (OLT), a value of total uplink bandwidth allocated by a passive optical network (PON) port of the OLT to a first group of optical network units (ONUs) according to a backpressure priority of the first group of ONUs;
wherein the PON port is connected to the first group of the ONUs and a second group of ONUs, wherein the first group of ONUs comprises at least one ONU and the second group of ONUs comprises at least one ONU, wherein the backpressure priority of the first group of ONUs is lower than a backpressure priority of the second group of ONUs.

5. The method according to claim 4, wherein the backpressure priority of the first group of ONUs and the backpressure priority of the second group of ONUs are pre-stored in a backpressure priority table.

6. The method according to claim 4, wherein the first group of ONUs comprises a first ONU and a second ONU, wherein a backpressure priority of the first ONU is lower than a backpressure priority of the second ONU; and
wherein the method further comprises:
reducing a value of allocated uplink bandwidth of a transmit container (T-CONT) corresponding to the first ONU according to the backpressure priority of the first ONU.

* * * * *

UNITED STATES PATENT AND TRADEMARK OFFICE
CERTIFICATE OF CORRECTION

PATENT NO. : 10,432,626 B2
APPLICATION NO. : 15/346579
DATED : October 1, 2019
INVENTOR(S) : Zheng et al.

Page 1 of 1

It is certified that error appears in the above-identified patent and that said Letters Patent is hereby corrected as shown below:

In the Claims

Claim 1, Column 25, Line 10: "port to the first group of ONUs." should read -- port to the first group of ONUs according to the backpressure priority of the first group of ONUs. --.

Signed and Sealed this
Twenty-fourth Day of March, 2020

Andrei Iancu
*Director of the United States Patent and Trademark Office*